Oct. 24, 1933.    S. G. STUCKEY    1,932,024
TIMING DEVICE FOR GLASS MACHINERY
Original Filed April 1, 1929    2 Sheets-Sheet 1

INVENTOR:
SAMUEL G. STUCKEY.

By Edward E. Longan
ATTORNEY.

Oct. 24, 1933.  S. G. STUCKEY  1,932,024
TIMING DEVICE FOR GLASS MACHINERY
Original Filed April 1, 1929   2 Sheets-Sheet 2
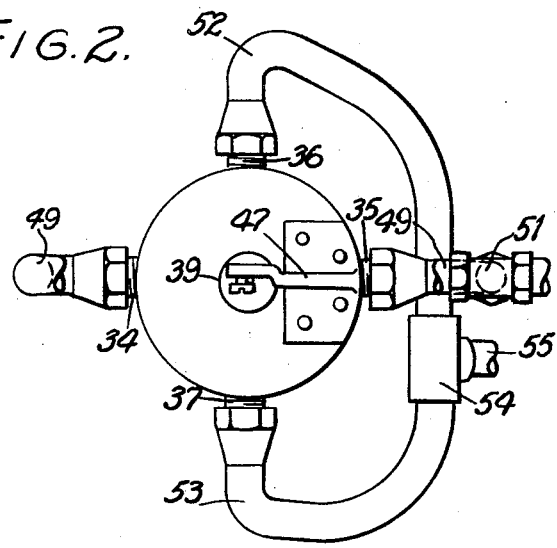
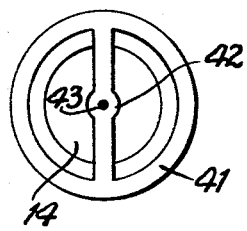
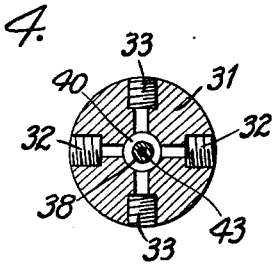
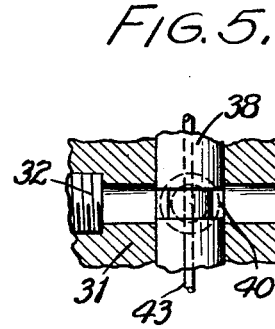
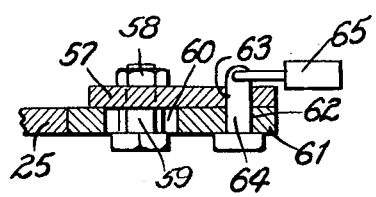
INVENTOR:
SAMUEL G. STUCKEY.
By Edward E. Longan
ATTORNEY.

Patented Oct. 24, 1933

1,932,024

UNITED STATES PATENT OFFICE 1,932,024

TIMING DEVICE FOR GLASS MACHINERY

Samuel G. Stuckey, St. Louis, Mo., assignor to Obear-Nester Glass Company, St. Louis, Mo., a corporation of Missouri Original application April 1, 1929, Serial No. 351,571, now Patent No. 1,772,092, dated August 5, 1930. Divided and this application February 12, 1930. Serial No. 427,750

12 Claims. (Cl. 161—7)

My invention relates to improvements in timing devices for glass machinery, and has for its primary object a timing device which will function accurately at predetermined periods at all times.

A further object is to construct a timing device which operates intermittently and in which the function will not be affected in any way by temperature changes.

A further object is to construct a timing device operating at predetermined frequencies, the frequency of operation being adjustable to meet various conditions.

A still further object is to construct a timing device which is controlled by the ingress and egress of liquid and which is independent of temperature variations. This device is especially applicable to the control of glass feeders because on account of the varying temperature conditions surrounding a glass furnace it has been almost impossible to maintain a steady timing of the feeder. This steady timing was not only effected by the temperature conditions surrounding the feeder but was due in many instances to variations of air pressure which controlled the timing apparatus and to steam pressure where electric driven timing apparatus was used. In fact in regard to the latter, the variation in steam pressure caused a consequent variation in the electric power on account of slowing or speeding up of the generator, which supplied the electric power. Consequently, when a motor drive was used for timing, the speed of the motor would vary directly as the power supplied to it from the generator would vary and then in addition as the motor became hot due to its proximity to the heat emanating from the glass furnace, a certain amount of energy was lost. Therefore accurate timing has been found to be practically impossible on an electric drive.

Various attempts have been made to use a pneumatic drive for this purpose but the same has been found defective because if the timing device is fed directly from an air compressor a steady source of air supply is impossible for the reason that said supply will be delivered in pulsations and these pulsations cannot be regular because as the source of driving power to the compressor varies the pulsations will vary. Then, again, if a storage tank is used it is impossible to control leakage through the various connections necessary. Such leakages may occur at any time and impair the accurate functioning of the timer and these leakages often require hours of time to find their location and consequent correction, and in the meantime the production of a plant using such a timer is materially reduced.

My device, however, will function accurately at all times and under all conditions because I have provided what may be termed a reserve source of power or supply, which will take care of abnormal conditions. In using variable speed motors a rheostat is required, which at its best can give only a certain number of speeds, this being positively controlled by the number of stations or contact points on the rheostat and no speed intermediate two stations can be obtained, but in a water or liquid timer the speed or frequency of operation can be indefinitely varied, even to fractions of a second, which is impossible with any other device.

This invention is a division of my application filed April 1st, 1929, Serial No. 351,571, and allowed January 10th, 1930, Now Patent No. 1,772,092, issued August 5, 1930.

In the drawings:

Fig. 2 is a top plan view of the timer per se;

Fig. 3 is a plan view of the spider employed in the bottom of the timing device;

Fig. 4 is a horizontal section taken through the fitting of Fig. 1 on the line 4—4.

Fig. 5 is an enlarged fragmental view with parts in section showing the construction of the operating valve; and Fig. 6 is an enlarged fragmental sectional view of the means for regulating the frequency of operation of the device.

Figure 1:
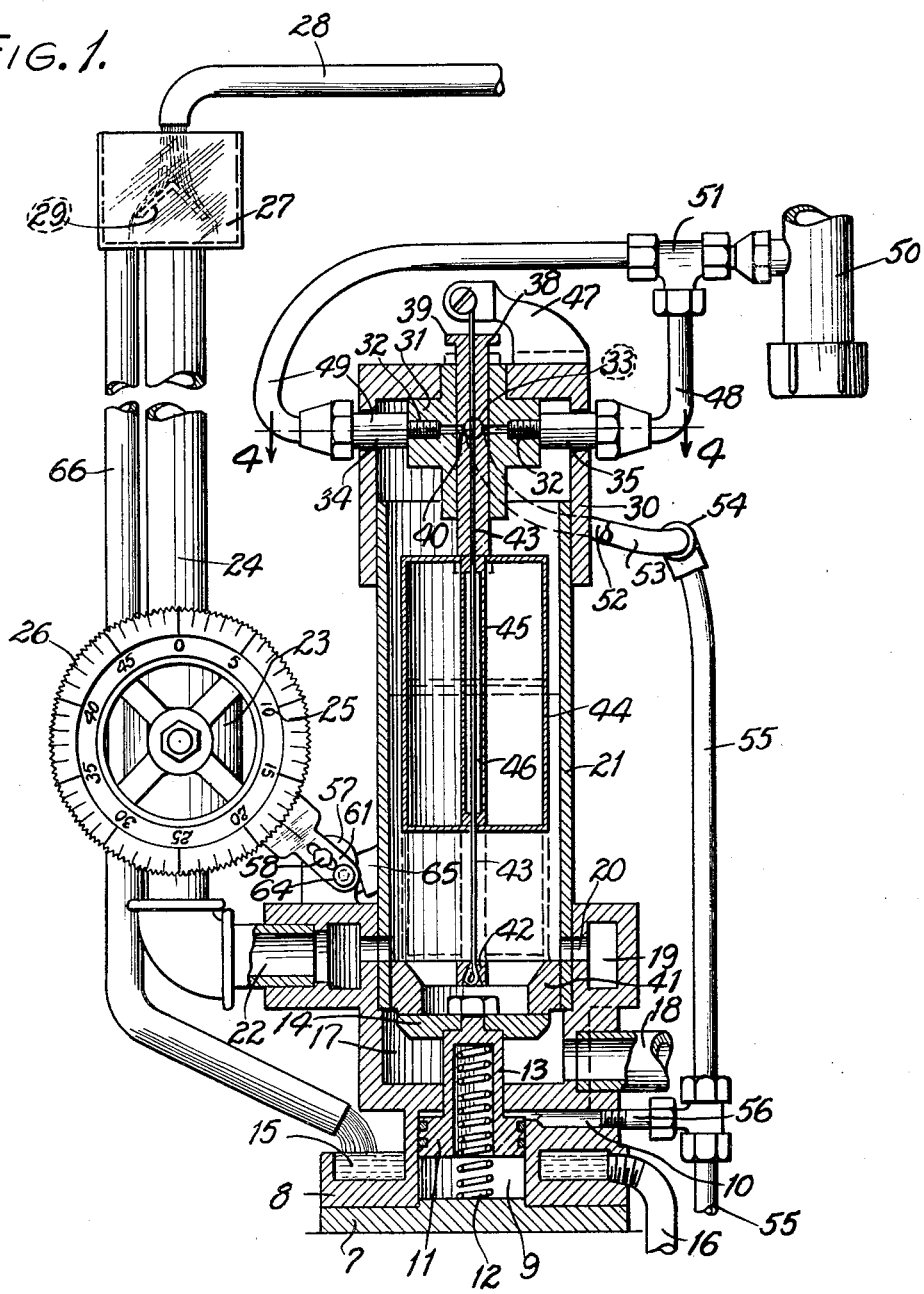
Fig. 1 is a side elevation of my device with parts broken away and in vertical section.

In carrying out my invention I employ a plate 7 on which is mounted a casting 8. This casting is secured in any conventional manner, such as by screws or the like. Within the casting 8 is formed a cylinder 9 having an air inlet 10 at its upper end. Mounted within the cylinder 9 is a piston 11 which is normally held in its uppermost position by means of a spring 12. The piston 11 is provided with a hollow stem 13 to the upper end of which is secured a valve or plate 14, the purpose of which will be hereinafter more fully described. The casting 8 is provided with a trough 15, which has a drain pipe 16 connected thereto so that any liquid entering this trough can be readily withdrawn.

The casting 8 is also provided with a waste chamber 17 to which a waste pipe 18 is connected and above the waste chamber 17 is provided a reservoir 19. This reservoir has ports 20 formed therein, which communicate with the lower end of a cylinder 21 carried by the upper end of the casting 8. A supply pipe 22 communicates with the reservoir 19. This pipe in turn is connected to a valve 23, which is carried by a stand pipe 24.

The valve 23 carries a hand wheel 25 having a serrated edge 26 and having graduations thereon. The purpose of these graduations will be explained in detail later.

Carried by the upper end of the stand pipe 24 is a reservoir 27, which is adapted to receive a liquid from a pipe 28, the liquid supply passing through the pipe being constant.

Within the reservoir 27 is provided a deflector 29, the purpose of which is to deflect the liquid emanating from the end of the pipe 28 into the reservoir 27 from exerting any gravity force whatsoever in the stand pipe 24 thereby possibly increasing its rate of flow into the cylinder 21.

The upper end of the cylinder 21 is provided with a cap 30, which cap carries a fitting 31. The fitting 31 is provided with a plurality of openings 32 and 33, these openings being in pairs and arranged diametrically opposite each other, and in these openings are secured nipples 34, 35, 36 and 37.

The fitting 31 has a central opening therethrough in which a pilot valve 38 is adapted to pass. This pilot valve is mounted so that it will have vertical movement only and is provided with a head 39, which limits its downward movement. The pilot valve 38 is also provided with a reduced portion 40 so that when the valve is raised to a certain degree it will permit communication between the ports or openings 32 and 33 in the fitting.

Mounted in the lower end of the cylinder 21 is a spider 41, which has a central boss 42 having an opening therethrough. This boss is designed to receive the lower end of a wire or guide rod 43. Located within the cylinder 21 is a float or buoy 44 which has extending vertically and centrally therethrough a guide member 45. This guide member is provided with openings through which the wire or guide rod 43 extends and has the portion 46 intermediate its ends cut away so as to reduce friction along the guide rod or wire as much as possible but still at the same time prevent any entrance of liquid into the float, which might affect its sensibility.

Carried by the cap 30 is a bracket 47 to which the upper end of the wire or guide rod 43 is secured. In this way I prevent any possibility, whatsoever, of the float from shifting sidewise and binding against the cylinder 21 so that at all times the same can rise vertically and in no other direction.

Secured in the openings 32 are pipes 48 and 49, which pipes in turn are secured to an air supply pipe 50. This pipe 50 being connected to any suitable source of air supply, preferably to a pressure tank wherein the air supply will be constant and without pulsations; the connection of these two pipes with the air supply pipe 50 being made by a connection 51.

Secured to the nipples 36 and 37 are pipes 52 and 53, which converge into a union 54. This union carries a pipe 55, the pipe 55 leading to the device to be timed.

The pipe 55 is provided with a by-pass 56, which will operate the valve 14 when the pilot valve is tripped thereby releasing the fluid from the cylinder 21 and permitting the float 44 to descend. As soon as the float 44 descends, the air supply is cut off thus permitting the valve 14 to re-seat itself and permit the timer to recommence its operation.

The casting 8 also carries an ear 57 through which a bolt 58 extends. This bolt 58 has a flattened portion 59, which flattened portion extends into a slot 60 carried by a locking dog 61. The locking dog is provided with an opening 62, which coincides with an opening 63 when the dog is in its locking position so as to receive a bolt 64.

The bolt 64 is secured in position and against unauthorized removal by means of a padlock or other similar locking device 65. My purpose in providing this locking means is to prevent unauthorized changes in the timing device, especially when the same is used for glass feeders, because it has been brought to my attention that whenever adjustments can be made, unskilled mechanics as to adjustments, while they may be skilled in operating the machine, will invariably tamper with adjustments which are convenient to handle and thereby destroy certain predetermined operations. This is especially noticeable in the glass art because if an operator has a chance to turn one hand wheel to make a slight alteration instead of paying attention to the fires in the boot or feed spout, he will invariably take the path of least resistance, but by locking this path of least resistance, he will have to become more skillful in handling his fires in order to keep up his quota of production. Then, again, where the timing device is used for other purposes, by locking the timer to a certain period of operation, it cannot be changed in any degree. This will prevent loafing on the job, such as cutting down production where the operator is paid by the hour or increasing production beyond a certain degree with a possible consequence of inferior work. In other words, by using my timing device when it is set for a certain number of operations per minute or per period of time, it cannot be changed by the operator but if any changes, in its periods of operation, when found necessary must be made by an authorized person, this adjustment makes my device especially valuable in various arts so that a highly skilled operator in charge of the apparatus is not required, whereas if various adjustments were necessary, the operator would have to be highly skilled in the art to make various adjustments. This enables me to cut down considerably the cost of production while at the same time maintaining a high standard of ware.

In order that the operator may ascertain at all times whether or not the device is functioning properly the reservoir 27 is provided with a pipe 66 so that as long as water is supplied to the reservoir 27, water will flow through this pipe and be discharged into the trough 15 and pass from there through the drain pipe 16. By this means the operator can ascertain at all times whether or not the stand pipe is full of water and whether the device is functioning properly because if the water level drops below the reservoir in the stand pipe 24, no water will pass down through the pipe 66.

My device is especially useful for timing glass machinery, such as feeders and forming machines, because I have found by experience that where the time of operation of the machine as a whole varies between successive gathers that there will be a change in weight of the gathers. For instance, if the glass machine is set to operate eighteen times a minute as indicated by the setting in Fig. 1, the operation of the machine must occur exactly eighteen times a minute but if a timing device is used to start the operation of the machine, which is subject to variations as an electrc motor would be, instead of operating eighteen times a minute the device might slow up between one of these periods so that eighteen full cycles of operation would not be obtained in one minute, and as a large portion of the gob is formed by gravity flow any slowing up of the machine between successive gobs would naturally cause a variation in weight of the gob resulting in a greater weight of glass being fed to the parison mold with a consequent increase in the weight of the finished articles, and it is a well known fact that modern requirements for glass containers, such as bottles, are very exact so that they will all hold an equal amount and when filled will all weigh the same.

It is for this reason that glass manufacturers maintain scales at the forming machine so that if bottles or similar containers are over or under weight they can be rejected and not passed to the packing room. Should the timing device speed up in any way it naturally follows that a light weight gob would be delivered, but by using a fluid as the timing means, variations in time cycles do not occur because the fluid in its operation of the timing device is not affected by temperature changes or otherwise.

The operation of my device is as follows: The pipe 50 is connected to any suitable source of air pressure, preferably a storage tank so that a substantially constant and equal pressure can be maintained and the pipe 28 to any suitable source of constant liquid supply. After the air pressure and liquid supply have been turned on the valve 23 is opened by releasing the dog 61, turning the hand wheel 25 so that a predetermined graduation will register with the line on the dog. The dog is then brought into contact with the serrated edge of the wheel as indicated in Fig. 1, the bolt 64 inserted and locked by means of the padlock 65. Water will then flow from the reservoir 27 through the stand pipe 24 and connecting pipe 22 into the reservoir 19 and then through the ports 20 into the cylinder 21 causing the float to rise. The float upon reaching its approximate upper limit will come in contact with the pilot valve 38 raising it so that its reduced portion 40 will be brought in alignment with the openings 32 and 33 thus permitting air to pass from the supply pipe 50 through the pipes 48 and 49 and then into the pipes 52 and 53 and down through the pipe 55 thus starting the operation of the machine as a whole.

At the same time this air passes down, air will pass through the by-pass or pipe 56 and be admitted into the cylinder 9 above the piston 11, working against the spring 12 driving the piston downward and unseating the valve 14 thereby suddenly permitting the water or liquid within the cylinder 21 to rush out suddenly and the float 44 to descend. This permits the valve 38 to drop so as to bring the reduced portion thereof out of alignment with the openings previously described closing off the air pressure and permitting the spring 12 to re-seat the valve 14 when the filling operation of the cylinder 21 again commences. It will be understood, of course, that by regulating the opening of the valve 23 by means of the hand wheel 25, the amount of liquid passing through this valve can be accurately regulated and consequently the time it takes the float to rise to a sufficient height to operate the pilot valve 38 can be goverened and controlled to a nicety, and since liquid is used to operate the float, ordinary temperature changes will not have any affect on the frequency of operation, especially since temperature changes as may occur around glass furnaces.

My device, as will be seen from the foregoing, is especially adapted for use on glass machinery because through long experience I have found that electric timing devices are not satisfactory because their speed can not be governed accurately as temperature changes and fluctuations in the power supplied to the timing motors cause sufficient variations in their operation to seriously affect the weight of the gob delivered, whereas if air pressure alone is relied upon as a timing element, this air pressure will vary due to temperature changes and also due to changes in speed of operation of the pump supplying the air because check valves or control valves for air cannot be made sensitive enough to operate under very slight variations of pressure.

Having fully described my invention, what I claim is:—

1. In a timing device comprising a liquid container having a normally closed bottom, means for admitting liquid to said container, means for regulating the rate of admission of said liquid, a float located in said container, said float being capable of vertical movement, a valve housing carried by the upper end of said liquid container, a conduit carried by said valve housing for delivering air under pressure thereto, an air valve located in said valve housing and adapted to be opened by said float when reaching its uppermost position, a second conduit carried by said valve housing and adapted to receive air therefrom when said valve is opened, and air operated means located below the bottom of the liquid container for opening said bottom and permitting said liquid to drain from the container when said air valve has been opened.

2. A timing device for glass machinery comprising a fluid container having an open bottom, a fluid valve for normally closing said bottom, means for admitting fluid to said container, a float located in said container, a valve housing, means for supplying air to said valve housing, an air valve located in said housing and adapted to be opened by said float, a conduit carried by said valve housing for receiving air therefrom when the air valve is opened, and air controlled means carried by said conduit for opening said fluid valve in the bottom of said fluid container when the air valve is opened thereby draining said fluid container and closing said valve.

3. A timing device for glass machinery comprising a container adapted to receive a liquid from a constant source of supply, means for regulating the flow of liquid to said container, a buoyant member located in said container and adapted for vertical movement, an air valve carried by said container and adapted to be opened by said buoyant member when the same reaches a predetermined height, and means for draining said container when said air valve has been opened, said air valve adapted to supply air to glass machinery from a constant source of supply.

4. A timing device for glass machinery comprising a container adapted to receive a liquid from a constant source of supply, means for regulating the flow of liquid to said container, a buoyant member located in said container and adapted for vertical movement, an air valve carried by said container and adapted to be opened by said buoyant member when the same reaches a predetermined height, means for draining said container when said air valve has been opened, said air valve adapted to supply air to glass machinery from a constant source of supply, and means for indicating a constant supply of fluid.

5. In glass machinery, a timing device comprising a liquid container having a bottom movable to open or closed position relatively of the contents of said container, means for conducting liquid to said container, a float in said container, fluid-controlled means for controlling the movement of said bottom to open position, and a valve controlled by said float for controlling the passage of said fluid to said last-mentioned means.

6. Mechanism for operating a control device including a chamber, a float in the chamber, means for delivering liquid to the chamber under constant pressure, a control valve between said means and the chamber whereby the rate of flow into said chamber may be accurately regulated, a vertically reciprocating member on said control device by which said device may be operated and positioned and adapted to be moved by the float, and a valve at the bottom of the chamber under control of said control device.

7. Mechanism for operating a control device including a chamber, a source of liquid supply for the chamber, a connection between said source and said chamber, means for maintaining a constant head of liquid at said connection, a control valve in said connection whereby the rate of flow through said connection to the chamber may be regulated, a float in the chamber, a vertically reciprocating member on the control device by which said control device may be operated and positioned and adapted to be moved by a float, and a valve at the bottom of the chamber under control of said control device.

8. Mechanism for operating a control device including a chamber, a standpipe, means for maintaining a constant level of liquid in the standpipe, a connection between the standpipe and the chamber, a control valve in said connection whereby the rate of flow through said connection to the chamber may be regulated, a float in the chamber, a vertically reciprocating member on the control device by which said control device may be operated and positioned and adapted to be moved by the float, and a valve at the bottom of the chamber under control of said control device.

9. Mechanism for operating a control device including a chamber, a standpipe, a header into which the standpipe is connected at its upper end, a continuous source of liquid supply for the header, an overflow pipe connected into the header and adapted to limit the level of liquid therein, a connection between the standpipe and the chamber, a float in the chamber, a vertically reciprocating member on the control device by which said control device may be operated and positioned and adapted to be moved by the float, and a valve at the bottom of the chamber under control of said control device.

10. Mechanism for intermittently operating a fluid valve including a chamber, a float in the chamber, means for delivering liquid to the chamber under constant pressure, a control valve in connection with said means whereby the rate of flow into said chamber may be accurately regulated, a vertically reciprocating member on the fluid valve by which a fluid valve may be operated and positioned and adapted to be moved by the float, a valve at the bottom of the chamber, means operated by fluid pressure to operate said last named valve, and a connection between said last named means and the outlet side of the fluid valve.

11. Timing mechanism for operating a control device including a chamber, a source of liquid supply for the chamber, means for regulating the rate of flow from said source of supply to the chamber, a buoyant member located in the chamber guided for vertical movement, a vertically reciprocating member adapted to operate the control device, and a drain valve operable by the control device for draining the chamber when the control device has been operated whereby draining of the chamber initiates a new cycle of the device, the periodicity of such cycle being regulated by said means for regulating the rate of flow to the chamber.

12. Mechanism for operating a control device including a chamber, a standpipe, a header into which the standpipe is connected at its upper end, a continuous source of liquid supply for the header, an overflow pipe connected into the header and adapted to limit the level of liquid therein, and open within view at its bottom end, a connection between the standpipe and the chamber, a float in the chamber, a vertically reciprocating member on the control device by which said control device may be operated and positioned and adapted to be moved by the float, and a valve at the bottom of the chamber under control of said control device.

SAMUEL G. STUCKEY.